United States Patent [19]

Wilkinson

[11] 4,342,064
[45] * Jul. 27, 1982

[54] STATIC DISTANCE RELAYS WITH IMPROVED POLARIZING SIGNAL

[75] Inventor: Stanley B. Wilkinson, Havertown, Pa.

[73] Assignee: General Electric Company, Philadelphia, Pa.

[*] Notice: The portion of the term of this patent subsequent to Jul. 10, 1996, has been disclaimed.

[21] Appl. No.: 241,318

[22] Filed: Mar. 6, 1981

Related U.S. Application Data

[63] Continuation of Ser. No. 32,303, Apr. 23, 1979, abandoned, which is a continuation-in-part of Ser. No. 879,635, Feb. 21, 1978, Pat. No. 4,161,011.

[51] Int. Cl.$^3$ .......................... H02H 3/26; H02H 7/26
[52] U.S. Cl. ......................................... 361/80; 361/85
[58] Field of Search .................. 361/80, 85, 81, 78, 361/79, 86, 87; 324/51, 52, 83 R, 83 Q

[56] References Cited

U.S. PATENT DOCUMENTS

| | | | |
|---|---|---|---|
| 3,374,399 | 3/1968 | Dewey | 361/80 |
| 3,626,281 | 12/1971 | Souillard | 361/85 X |
| 3,898,530 | 8/1975 | Perez-Cavero | 361/85 |
| 4,034,269 | 7/1977 | Wilkinson | 361/80 X |
| 4,091,433 | 5/1978 | Wilkinson | 361/76 |
| 4,092,690 | 5/1978 | Wilkinson | 361/80 |
| 4,148,087 | 4/1979 | Phadke | 361/80 |
| 4,161,011 | 7/1979 | Wilkinson | 361/80 |

OTHER PUBLICATIONS

S. B. Wilkinson et al., "Dynamic Characteristics of MHO Distance Relays," present to Pennsylvania Electric Association Relay Committee Winter Meeting, Philadelphia, Pa. Feb. 22–23, 1979.

*Primary Examiner*—Patrick R. Salce
*Attorney, Agent, or Firm*—William Freedman; John P. McMahon

[57] ABSTRACT

A distance protective relay employing phase angle comparator measurement is provided with an improved polarizing signal. In one embodiment, a phase distance relay is provided with a two-component polarizing signal which includes one component representative of a faulted transmission line voltage and a second component representative of the product of a predetermined constant and the positive sequence component of the faulted transmission line voltage. One preferred polarizing signal for a phase AB phase distance relay is $V_{POL} = V_{AB} + KV_{AB1}$, where K is approximately 0.3. Such a polarizing signal results in improved relay operation under certain fault conditions, especially under steady state conditions. In another embodiment, a ground distance relay is provided with a two-component polarizing signal. For, example, one preferred polarizing signal for a phase A ground distance relay is $V_{POL} = V_A + KV_{AJ}$, where K is approximately 0.3. Other embodiments are disclosed.

8 Claims, 11 Drawing Figures

STEADY STATE CHARACTERISTIC

PRIOR ART

STEADY STATE CHARACTERISTIC OF PRIOR ART RELAY OF FIG. 3

*Fig. 5*

STEADY STATE CHARACTERISTIC
OF RELAY 30 OF FIG. 5

STATIC DISTANCE RELAYS WITH IMPROVED POLARIZING SIGNAL

The present application is a continuation of application Ser. No. 32,303 filed Apr. 23, 1979, now abandoned which, in turn, is a continuation-in-part of Ser. No. 879,635, now U.S. Pat. No. 4,161,011 filed Feb. 21, 1978, entitled, "Ground Distance Relay Employing Phase Comparator Measurement", hereby incorporated by reference into the present application. The assignee of the present application has disclaimed all that portion of the term of any patent to be issued on said application subsequent to July 10, 1996, the expiration date of U.S. Pat. No. 4,161,011.

BACKGROUND OF THE INVENTION

The present invention relates to protective distance relays for use in a-c power systems, and more particularly to a distance relay employing an improved polarizing signal.

As a result of advancements in solid state technology, static relays have been developed which employ a phase comparator method of measurement. Exemplary circuits for phase comparator static relays are disclosed in U.S. Pat. No. 4,034,269, entitled "Protective Relay Circuits", issued July 5, 1977 to S. B. Wilkinson. This patent is assigned to the assignee of the present invention and is hereby incorporated by reference into the present application.

In the phase comparator method of measurement, the relay operates by measuring the angle between two or more phasors derived within the relay. Briefly, this is accomplished by the use of an a.c. coincidence circuit in combination with a timer circut. For example, in the case of the phase distance relay of FIGS. 6 and 7 of my previously referenced U.S. Pat. No. 4,034,269, a coincidence detector 286 develops an output signal when phase coincidence exists between a polarizing signal ($V_{AB}$) and an operating signal [$(I_A-I_B)Z_R-V_{AB}$]. A timer 288 then measures the duration of the phase coincidence and operates when phase coincidence occurs for a predetermined minimum time equal to the relay operate time. It is to be appreciated that, for faults within the intended reach of the relay, the phase coincidence is greater than ¼ cycle. Thus, for 60 cycle protective relaying applications, where ¼ cycle equals 4.167 ms, the timer is ordinarily set at 4.167 ms.

Although the above-described phase distance relay is widely employed, under certain unusual conditions, the relay may function improperly. In order to reduce the chances for such improper relay operation, phase distance relays have been developed which have a "variable mho characteristic" wherein the operating characteristic of the relay is a function of the power system conditions. That is, the characteristic has a diameter which is a function of the source impedance behind the relay and the relay reach setting. Such a "variable mho characteristic" is more fully explained on page 2 of my copending application of Ser. No. 879,653, filed Feb. 21, 1978, now U.S. Pat. No. 4,161,011 of which the present application is a continuation-in-part.

The "variable mho characteristic" is generally obtained by employing a polarizing voltage other than the faulted phase voltage, i.e., the faulted phase voltage for the phase AB relay would be $V_{AB}$. Further discussion of polarizing voltages can be found in the article entitled, "Polarized mho Distance Relay", by Wedepohl in PROC. IEE, Vol. 112, No. 3, March, 1965. Polarizing voltages suitable for obtaining such a "variable mho characteristic" for the phase AB relay include: $V_{AB1}$, representing the positive sequence component of the faulted phase voltage $A_{AB}$; and $V_{AB}+KV_{CN}\angle-90°$, where K is a constant of relatively small magnitude so as to have a minimal effect on the response of a phase AB relay for faults involving the C phase.

Although the above-described polarizing voltages provide a "variable mho characteristic", there are still system conditions under which the phase relay may either function improperly, or, under which it may be difficult to define the limits of proper relay operation. For example, employing only the positive sequence component of the faulted phase voltage, $V_{AB1}$, as the polarizing signal is unsatisfactory for those applications in which substantial load flow over the system is expected, especially with load flow in the tripping direction. This unsatisfactory result arises because the positive sequence voltage is largely a function of the prefault voltage at the relay while the fault current is largely a function of the prefault voltage at the source behind the relay. As the angle between the prefault voltage at the source and at the relay location increases, the likelihood of relay operation will decrease until this angle is sufficiently large to preclude relay operation. Similarly, employing $V_{AB}+KV_{CN}\angle-90°$ as the polarizing signal presents a problem in establishing relay performance on faults involving the C phase, particularly on protected lines having heavy load flow and series compensation.

Accordingly, it is a general object of my invention to provide a distance relay having a polarizing signal which results in improved relay operation.

It is another object of my invention to provide a phase distance relay having a polarizing signal which results in improved relay operation.

It is another object of my invention to provide a ground distance relay having a polarizing signal which results in improved relay operation.

SUMMARY

In carrying out one form of my invention, I provide a distance protective relay for one or more transmission lines in a three phase a-c power system. The relay circuit is of the phase angle comparator type and includes AND circuit means responsive to phase coincidence of at least two input signals thereto, one input signal being an operating signal and a second input signal being a polarizing signal. The operating signal is related to the sum of (1) the product of transmission line current and a replica impedance of the transmission line and (2) transmission line voltage. The polarizing signal is related to transmission line voltage. The relay circuit includes TIMER circuit means responsive to an output signal of the AND circuit means for producing a TIMER output signal when the phase coincidence of the input signals is of a predetermined duration. The relay includes an improved polarizing signal.

The polarizing signal is related to the sum of (1) a faulted transmission line voltage and (2) the product of a predetermined constant and the positive sequence component of the faulted transmission line voltage.

BRIEF DESCRIPTION OF THE DRAWINGS

While the specification concludes with claims particularly pointing out and distinctly claiming that which is regarded as the present invention, the objects and advantages of this invention can be more readily ascertained from the following description of preferred embodiments, when taken in conjunction with the accompanying drawings, in which:

DETAILED DESCRIPTION OF THE INVENTION

In order to appreciate the present invention, it is helpful to first discuss a prior art phase distance relay and then discuss applicant's phase distance relay which employs an improved polarizing signal.

PRIOR ART PHASE DISTANCE RELAY

Figure 1:
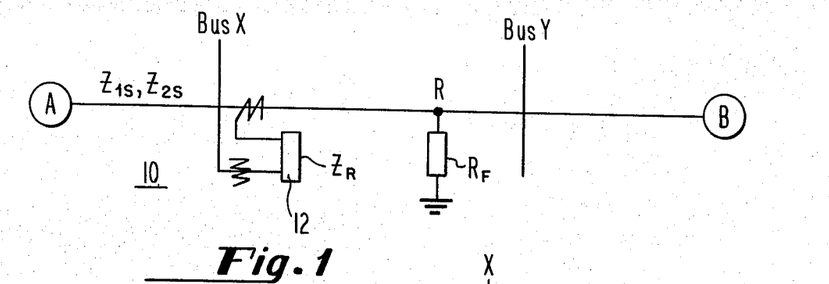
FIGS. 1, 2 respectively depict a simple one line representation of a 3 phase a-c power system with a Prior Art phase distance relay and a steady state relay characteristic associated therewith. A fault is taken at R of FIG. 1.

Referring initially to FIG. 1, a typical a-c power system is generally designated 10. The one line power system 10 includes power sources A and B, actually representing a three phase power system (phases A, B, C). Buses X, Y, respectively, are connected to the A, B power sources. A phase distance relay 12 is connected at bus X. The relay reach is taken as replica impedance $Z_R$ at an angle of approximately 85°, which is equal to the angle of the line impedance $Z_L$ and the source impedance $Z_S$. The system impedances (positive sequence, negative sequence) from power source A to the relay 12 are respectively designated $Z_{1S}$, $Z_{2S}$. A phase-to-phase to ground fault is schematically shown at R with a fault resistance of $R_F$ which is of a value such that the impedance $Z_F$, i.e., the impedance from point X to point R and resistance $R_F$, seen by the relay 12 at X extends just enough to touch the operating characteristic in the first quadrant of the "steady state" circular characteristic of FIG. 2.

Figure 2:
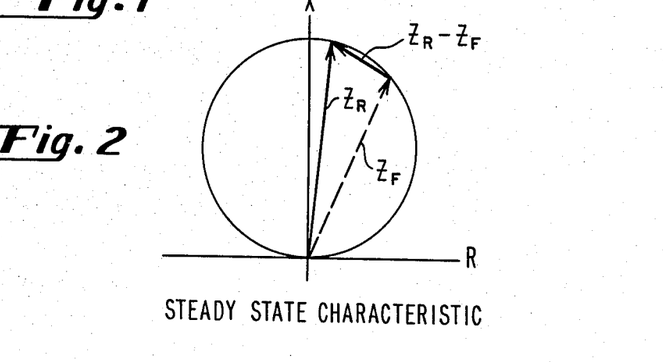

For purposes of clarity, only the "steady state" characteristic is shown because, as will be apparent later, the improved polarizing signal of the present invention is most significant in providing an improved "steady state" characteristic. As is known in the art, the "dynamic" characteristic is the characteristic which exists immediately after the inception of the fault. Following fault inception, the "dynamic" characteristic begins to shrink toward the "steady state" characteristic. The particular characteristic which determines the actual reach along the R-axis depends upon the operating time of the relay. Further discussion of the "dynamic" and "steady state" characteristics can be found in the paper entitled, "Dynamic Characteristics Of Mho Distance Relays", by S. B. Wilkinson and C. A. Mathews, Power Systems Management Business Department, General Electric Company, Philadelphia, Pa., presented to Pennsylvania Electric Association Relay Committee Winter Meeting, Philadelphia, Pa., Feb. 22-23, 1979.

Figure 3:
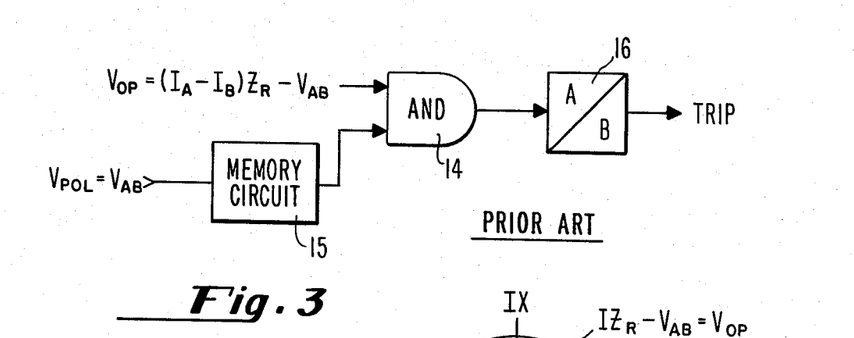
FIG. 3 is a functional block diagram of a portion of a circuit for the prior art phase distance relay of FIG. 1. This block diagram is similar to FIG. 6 of U.S. Pat. No. 4,034,269 of Wilkinson, entitled, "Protective Relay Circuits", issued July 5, 1977, and assigned to the assignee of the present application.

Referring now to FIG. 3, a portion of a block diagram of the phase distance relay 12 of FIG. 1 is shown. This phase distance relay 12 is substantially the same as the one depicted in FIGS. 6, 7 of my previously referenced U.S. Pat. No. 4,034,269. The phase distance relay 12 includes an AND circuit 14 (coincidence circuit) for receiving an operating signal ($V_{OP}$) and a polarizing signal ($V_{POL}$). For the phase AB distance relay, $V_{OP}$ comprises $(I_A - I_B) Z_R - V_{AB}$. The block diagram of FIG. 3 is representative of the prior art as the polarizing signal $V_{POL}$ is shown as $V_{AB}$, i.e., the faulted phase-to-phase voltage. This polarizing signal $V_{AB}$ is processed through a memory circuit 15 and passed to the AND circuit 14. The memory circuit 15 assures that the initial polarizing signal to AND circuit 14 after the fault inception is the prefault AB voltage. The output of the AND circuit 14 is coupled to a timer circuit 16. The timer circuit 16 measures the duration of phase coincidence of $V_{POL}$ and $V_{OP}$ and operates when phase coincidence occurs for a predetermined minimum time equal to the relay operate time. Further information on AND circuitry and timer circuitry can be found in my copending application of Ser. No. 879,653, filed Feb. 21, 1978, now U.S. Pat. No. 4,161,011 of which the present application is a continuation-in-part application.

Figure 4:
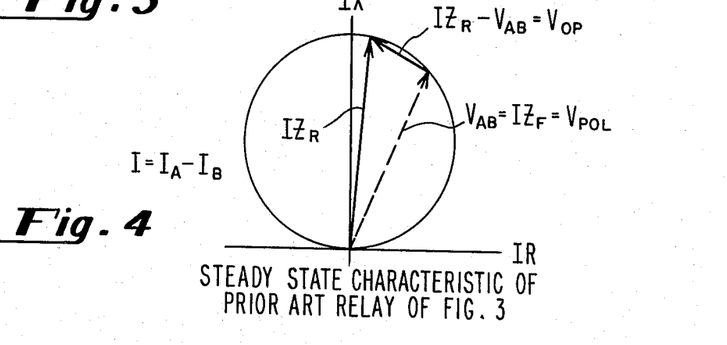
FIG. 4 is a voltage diagram obtained by multiplying the impedances of the FIG. 2 characteristic by the fault current.

FIG. 4 depicts a voltage diagram obtained by multiplying the impedances ($Z_F$, $Z_R$) of FIG. 2 by the fault current I, I being taken as the faulted phase current $I_A - I_B$. The voltage $V_{AB}$ at the relay 12 during the fault is equal to the product of the fault current I and the fault impedance $Z_F$. The operate signal is $IZ_R - V_{AB}$ or $I(Z_R - Z_F)$. The polarizing signal is $IZ_F$ or $V_{AB}$.

THE PHASE DISTANCE RELAY OF THE PRESENT INVENTION

Figure 5:
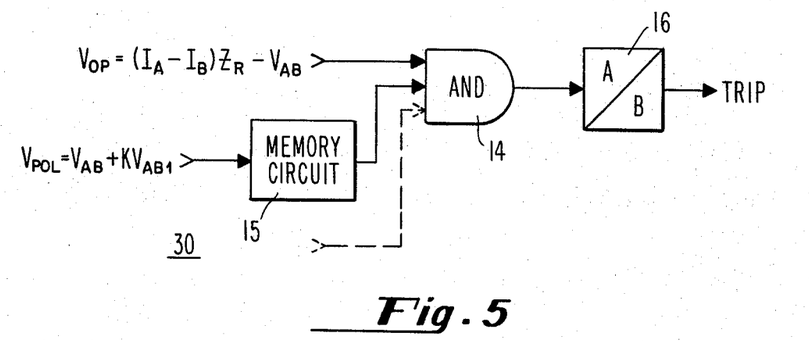
FIG. 5 is a portion of a block diagram of one form of the phase distance relay of the present invention.

Referring now to FIG. 5, a portion of a block diagram of one form of the phase distance relay of the present invention is generally designated 30. The phase distance relay 30 is similar to the prior art phase distance relay shown in FIG. 3 in substantially all respects other than the polarizing signal $V_{POL}$. More particularly, the polarizing signal of the FIG. 3 prior art relay for phases AB, is $V_{AB}$, whereas the polarizing signal $V_{POL}$ of the phase distance relay 30 of the present invention for phases AB is $V_{AB} + KV_{AB1}$, where $V_{AB1}$ represents the positive sequence component of the faulted phase-to-phase voltage $V_{AB}$ and K is a design constant. An exemplary value for the design constant K for a typical system is 0.3 per unit. As is known in the art, $V_{AB1}$ and K can be simply derived.

Figure 11:
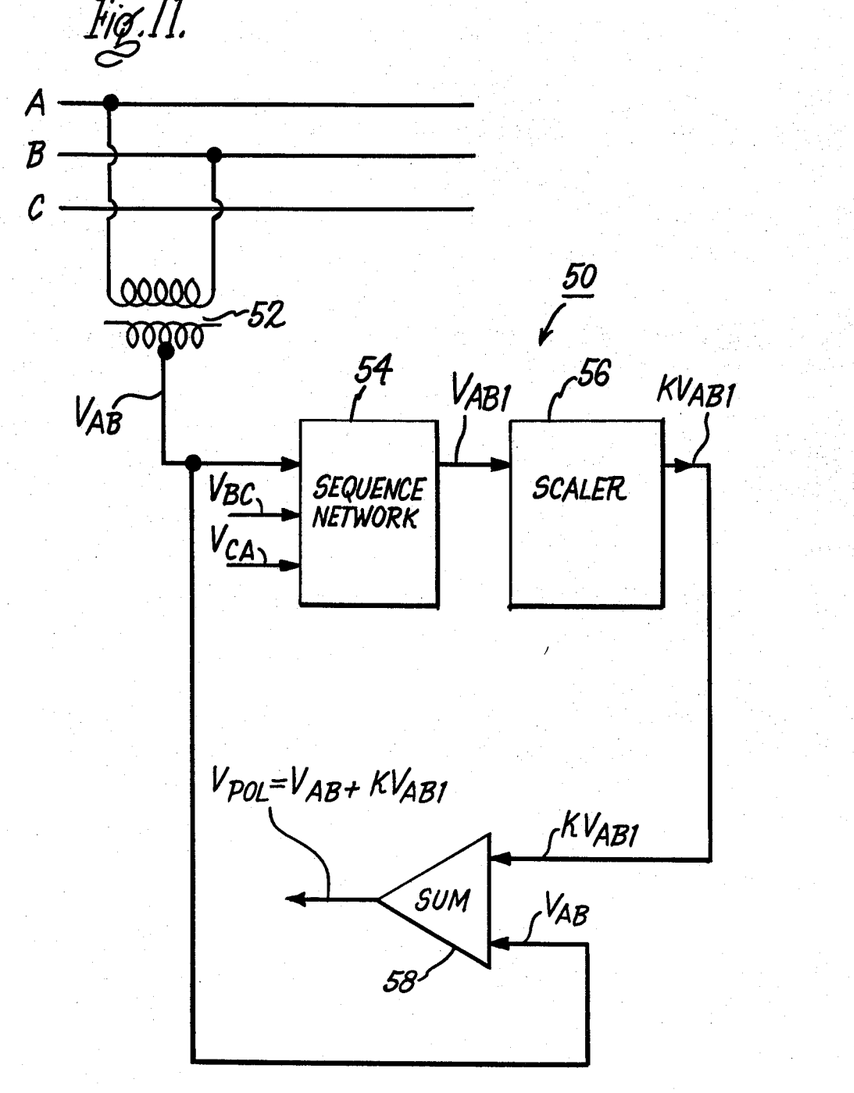
FIG. 11 is a block diagram showing an exemplary circuit for developing polarizing signals of the present invention.

Reference is now made to FIG. 11 showing an exemplary circuit 50 for developing the two component polarizing signal $V_{POL}$. FIG. 11 shows a conventional potential transformer 52 connected across phases A and B of the power system 10 for the development of the faulted phase-to-phase voltage $V_{AB}$. Voltage $V_{AB}$ is routed to a sequence network 54 and also to a conventional summing amplifier 58. Voltages $V_{BC}$ and $V_{CA}$ which are phase-to-phase voltages between phases B and C and phases C and A, respectively, are also developed by separate conventional potential transformers 52 (not shown) and are also routed into sequence network 54. Sequence network 54 may be of the type described in U.S. Pat. No. 3,992,651 of M. E. Hodges, entitled "Active Symmetrical Component Network for Protective Relays" which issued Nov. 16, 1976, and is assigned to the same assignee of the present invention. U.S. Pat. No. 3,992,651 describes a sequence sensitive circuit 10, having an output signal E expressed in one of its embodiments by its equation (8), for developing a signal such as voltage $V_{AB1}$ representative of the positive sequence component of the faulted phase-to-phase voltage $V_{AB}$. Voltage $V_{AB1}$ is further routed into a conventional scaler circuit 56 to provide the desired voltage $KV_{AB1}$ wherein K is a constant to be further described. The output signal $KV_{AB1}$ of scaler 56 is routed to an input of the summing amplifier 58 which, as previously described, has the signal $V_{AB}$ applied to a second input. The output of summing amplifier 58 develops the desired two component polarization signal $V_{POL} = V_{AB} + KV_{AB1}$.

Figure 6:
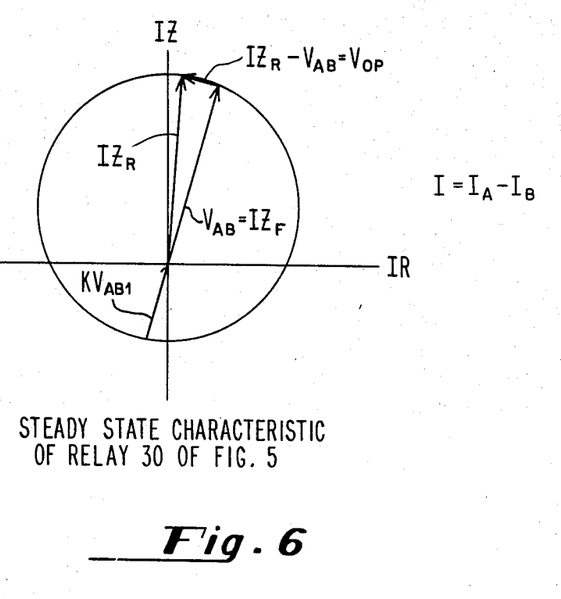
FIG. 6 depicts a steady state characteristic associated with the phase distance relay of FIG. 5.

Referring now to FIG. 6, the steady state characteristic of the phase distance relay 30 of FIG. 5 is shown. An important difference between the Prior Art steady state characteristic of FIG. 4 and the steady state characteristic of FIG. 6 is that the FIG. 6 characteristic includes the origin, but still retains its directional integrity, resulting from the use of the $KV_{AB1}$ component. Other advantages of the phase distance relay 30 of FIG. 5 will be discussed later through the use of phase diagrams.

The preferred two-component polarizing signal $V_{POL}$ of $V_{AB} + KV_{AB1}$ (phases AB) of the present invention effectively reduces the disadvantages of each individual component therein. In this connection, in the absence of fault resistance ($R_F$), and other than faults close to the relay location, the component $V_{AB}$ is a satisfactory polarizing signal. That is, referring to the system of FIG. 1, for such situations, $V_{AB}$ would be essentially in phase with $IZ_R$ and the operate signal ($V_{OP}$) would be in phase with $IZ_R - IZ_F$. With $Z_R$ (replica impedance) and $Z_F$ (fault impedance) in phase, the operate signal ($V_{OP}$), and polarizing signal ($V_{POL}$), would be in phase for internal faults, resulting in optimum relay performance. The fault current (I) establishes both the operate signal ($V_{OP}$) and the polarizing signal ($V_{POL}$) so that load flow over the system does not affect the phase relation of the operate and polarizing voltages.

Figure 7:
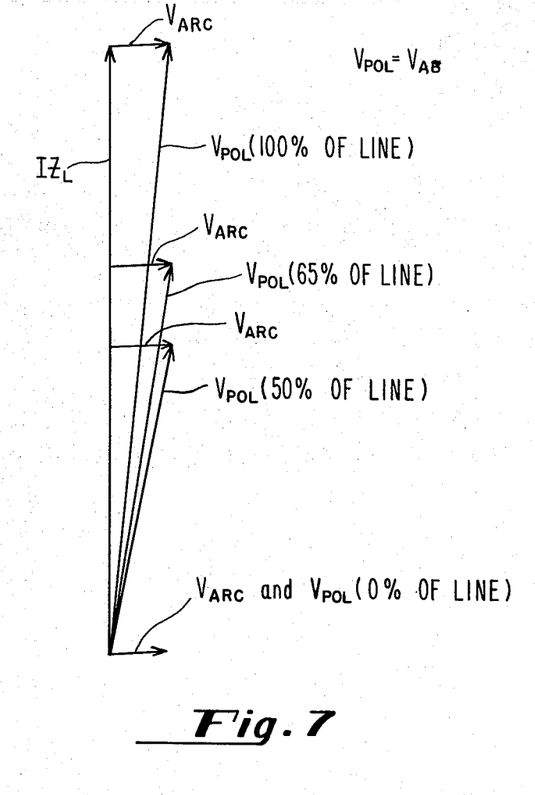
FIG. 7 is a diagrammatic representation of the manner in which a faulted phase polarizing signal varies as the fault location moves with respect to the relay location.

However, the presence of the voltage drop in the arc develops fault resistance ($R_F$). This arc voltage drop is typically approximately 85° out of phase with the voltage drop in the line impedance when the system impedance angle is 85°. With adverse load flow, the arc voltage drop may become substantially more than 85° out of phase with the voltage in the line. Under arc voltage drop conditions, if the polarizing signal ($V_{POL}$) were $V_{AB}$ only, the polarizing voltage would seriously deteriorate as the fault location moves closer to the relay location. This deterioration of the polarizing signal $V_{AB}$ is diagrammatically shown in FIG. 7 for the no load flow case. More particularly, FIG. 7 shows the change in the polarizing signal $V_{POL}$, where $V_{POL}$ is $V_{AB}$ only, for various fault locations at 0%, 50%, 65%, and 100% of the protected line, the protected line having an impedance angle of 85° (the same as the replica impedance $Z_R$) and the source impedance having the same angle as the line impedance. In FIG. 7, no load flow is assumed, and the arc voltage drop ($V_{ARC}$) is taken at a typical 5% of rated voltage. Note that the $V_{AB}$ polarizing signal becomes a very good polarizing signal as the fault location moves away from the relay location. For example, for the condition shown in FIG. 7, the $V_{AB}$ phase position is within about 11° of the $IZ_L$ phase position for a fault location at 50% of the protected line.

The positive sequence component of $V_{AB}$, designated $V_{AB1}$, is generally an excellent polarizing signal for phase-to-phase, and phase-to-phase-to-ground faults, when there is no load flow over the system. Note that, as is well known in the art, for a phase-to-phase fault at the relay location, the positive sequence voltage $V_{AB1}$ will be approximately 0.5 pu whereas the arc drop voltage will be in the order of 0.05 pu, where 1 pu represents the prefault voltage $V_{AB1}$. This results in only a slight shift in the polarizing voltage position with respect to the $IZ_R$ phase position.

However, the performance of the single component polarizing signal $V_{AB1}$ as a polarizing signal deteriorates with the presence of substantial load transfer over the system, especially when the load flow is in the tripping direction. Note that the phase relationship of the positive sequence voltage $V_{AB1}$ to $IZ_R$ is largely determined by the angular separation between the source voltage behind the relay and the voltage at the relay location. In this connection, the heavier the load transfer, the more out of phase the positive sequence voltage $V_{AB1}$ will be with the $IZ_R$ voltage, with $V_{AB1}$ lagging $IZ_R$ (with load flow in the tripping direction). Of importance, however, is that, on close-in faults, $V_{AB1}$ is superior to $V_{AB}$ as a polarizing signal.

Accordingly, a two-component polarizing signal such as the previously mentioned combination of component $V_{AB}$ and component $V_{AB1}$ represents a means of optimizing the polarizing signal for a phase distance relay. As indicated in FIGS. 5, 6, I have found it desirable to weight the positive sequence portion of the two-component polarizing signal so that the resultant polarizing signal is $V_{AB} + KV_{AB1}$, where K is a design constant. In a preferred polarizing signal, the design constant K is selected to have a value so as to produce a positive sequence component signal having approximately three times the anticipated arc voltage drop for a close-in phase-to-phase fault, and two times the arc voltage drop for a typical phase-to-phase to ground fault. In such polarizing signal, as previously mentioned, the preferred value of the weighting constant K is 0.3. Accordingly, I have found a preferred polarizing signal for phases AB to comprise: $V_{AB} + 0.3 V_{AB1}$. This preferred polarizing signal provides an acceptable polarizing signal for the close-in faults and also allows the faulted phase voltage to improve the polarizing signal angle for fault locations near the remote terminal where the operate signal will have its maximum leading angle. It is helpful to note that the positive sequence voltage portion of the preferred polarizing signal has a phase position which is essentially unaffected by faults on the other phases.

Figure 8:
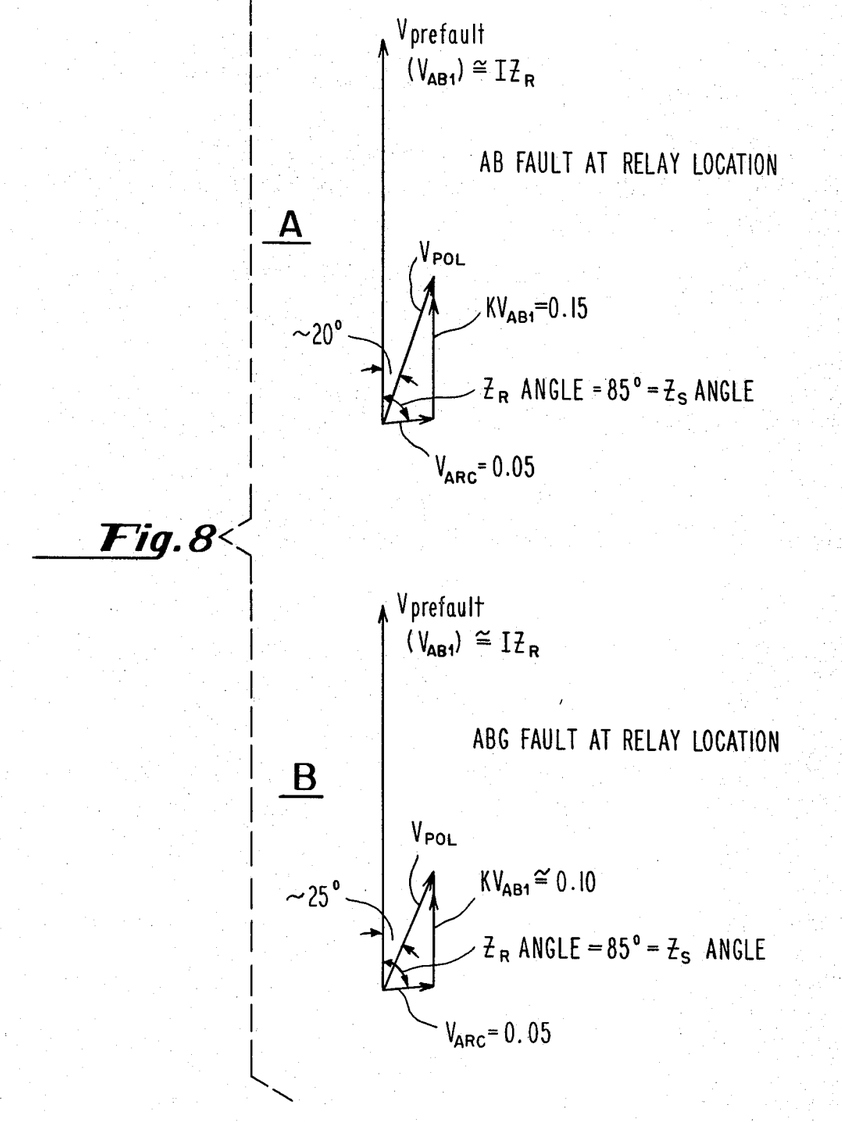
FIGS. 8A, 8B are the phasor diagrams depicting the operation of one form of phase distance relay of the present invention under two different fault conditions.

It is helpful to refer to the phasor diagrams of FIGS. 8A, 8B for guidelines which may be employed in selecting the value of the design constant K. More particularly, referring to FIG. 8A, a phase-to-phase fault (AB) is taken at the relay location. If K is selected to be 0.3 for illustrative purposes: $KV_{AB1}=0.3\times 0.5=0.15$. When $KV_{AB1}$ is added to the arc voltage drop ($V_{ARC}=0.05$), the resultant polarizing signal, $V_{POL}$, is shifted only about 20° from the position of $V_{AB1}$, representing substantially the same phase position as $IZ_R$ for no load conditions. Under load flow conditions, $IZ_R$ will lead or lag $V_{AB1}$ depending upon the angular separation between the prefault relay voltage and the source voltage behind the relay.

Referring now to FIG. 8B, a phase-to-phase-to-ground fault (ABG) is taken at the relay location. Typically, a ground distance relay will be additionally provided to detect such a fault. Accordingly, the phase-to-phase situation of FIG. 8A is generally more important in selecting the value of the design constant K. Assuming the positive sequence voltage at the relay for an ABG fault close-in is 0.33 pu, with K=0.3, $KV_{AB}=0.3\times 0.33=0.10$. Under these fault conditions, $V_{POL}$ is shifted about 25° from $V_{AB1}$. Note that, if the design constant K is greater than 0.3, the $IZ_F$ drop in the line for faults some distance away from the relay will be less effective in obtaining the optimum polarizing signal.

Referring again to FIG. 5, a dashed line is shown directed into AND circuit 14 of the phase distance relay of FIG. 5, as additional signal inputs may be provided. For example, one such additional signal may comprise $(I_A-I_B)Z_R$. Such an additional signal may provide a form of current supervision.

Figure 9:
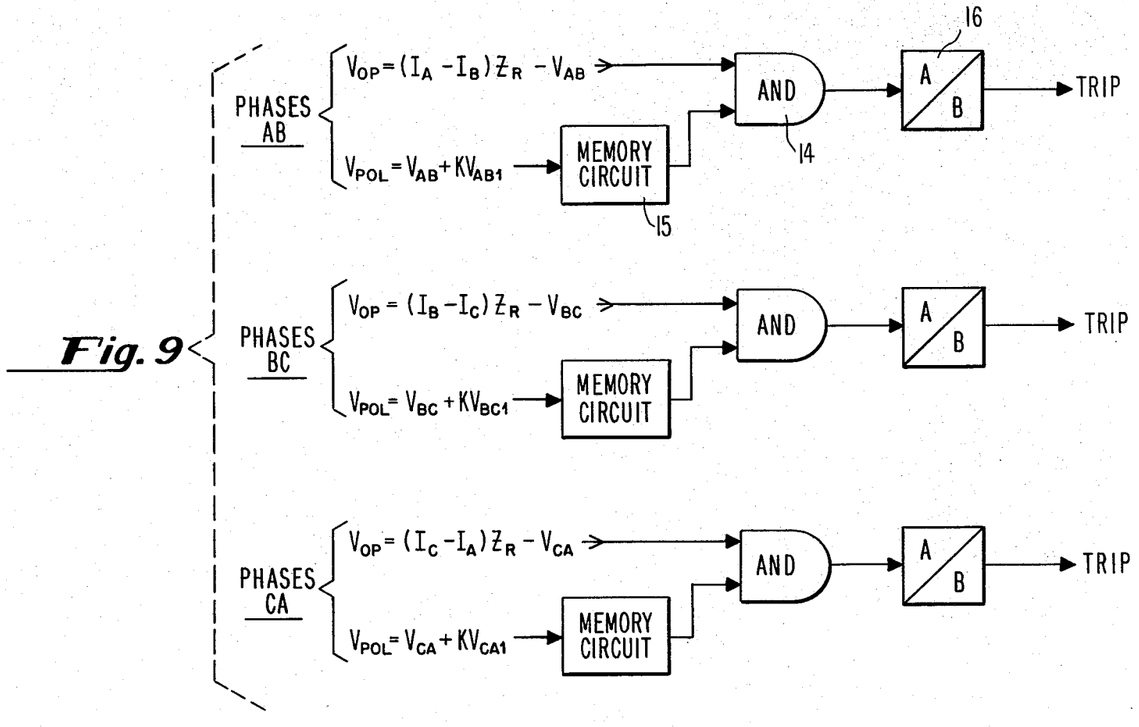
FIG. 9 is a portion of a block diagram of one form of phase distance relay of the present invention employed in connection with a three phase a-c power system.

Referring now to FIG. 9, a portion of a block diagram for three phase distance relays is depicted. Each of the phase distance relays is similar to the phase AB distance relay hereinbefore discussed and depicted in FIG. 5.

Figure 10:
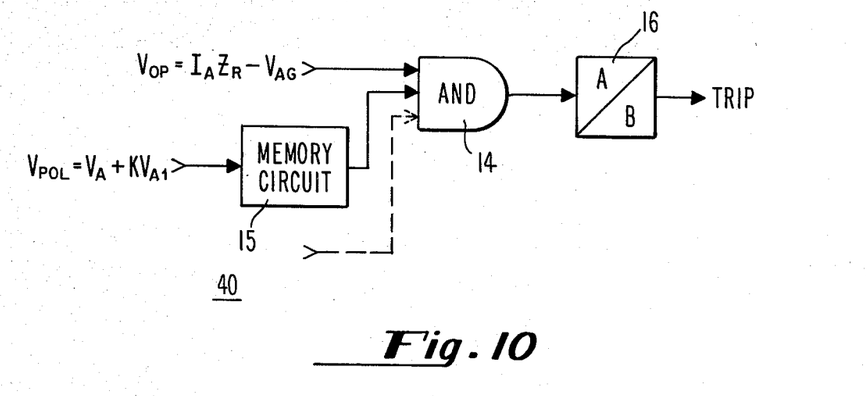
FIG. 10 is a portion of a block diagram, similar to FIG. 5, showing one form of a ground distance relay of the present invention.

Referring now to FIG. 10, a portion of a block diagram of a ground distance relay is shown. This ground distance relay is provided with an improved polarizing signal in accordance with the present invention. More particularly, the ground distance relay 40 of FIG. 10 is substantially the same as the phase distance relay 30 of FIG. 5 herein but employs single phase quantities as inputs thereto. The operating signal ($V_{OP}$) for phase A comprises $I_A Z_R - V_{AG}$ while the polarizing signal ($V_{POL}$) comprises $V_A + KV_{A1}$, where K is a design constant of a typical value, i.e., 0.3. A dashed line is shown in FIG. 10 directed into AND circuit 14 as other inputs may be provided. For example, exemplary additional inputs are disclosed in my copending patent application of Ser. No. 879,653, filed Feb. 21, 1978, now U.S. Pat. No. 4,161,011 of which this application is a continuation-in-part.

Advantages of the improved polarizing signal $V_A + KV_{A1}$ in the ground distance relay of FIG. 10 are realized when line side potential is employed in single pole tripping and reclosing schemes where the polarizing signal for phase A is not materially affected during the time period when either phase B or phase C is open, since the protection of phase A must remain operable during this time period.

GENERAL CONSIDERATIONS

Particularly useful in providing exemplary circuitry for protective relaying applications is the publication designated, GEK-34158B, Printed Circuit Cards for MODIII Static Relay Equipment (for use in static line relays with Model No.'s 50 and up). This publication is available from General Electric Company, Power Systems Management Business Department, Philadelphia, Pa. 19142. Also, positive negative and zero sequence current voltage symmetrical component networks are described in the textbook "Symmetrical Components" by Wagner and Evans, published by McGraw-Hill in 1933 and in the aforementioned U.S. Pat. No. 3,992,651. Similarly, transactor circuits and devices are well known in the art; one suitable reference is U.S. Pat. No. 3,374,399, entitled, "Distance Protective Relaying", issued Mar. 19, 1968 and assigned to the assignee of the present application.

While I have shown and described a particular embodiment of my invention, it will be obvious to those skilled in the art that various changes and modifications may be made without departing from the invention in its broader aspects; and I, therefore, intend in the appended claims to cover all such changes and modifications as fall within the true spirit and scope of my invention.

What is claimed as new and desired to be secured by Letters Patent of the United States is:

1. In a distance protective relay for one or more transmission lines in a three phase a-c power system, the relay circuit being of the phase angle comparator type and including AND circuit means responsive to phase coincidence of at least two input signals thereto, one input signal being an operating signal and a second input signal being a polarizing signal, the operating signal being related to the sum of (1) the product of transmission line current and a replica impedance of the transmission line and (2) transmission line voltage, the polarizing signal being related to transmission line voltage, TIMER circuit means responsive to an output signal of the AND circuit means for producing a TIMER output signal when the phase coincidence of the input signals is of a predetermined duration, wherein the improvement comprises:

said polarizing signal being related to the sum of (1) a faulted transmission line voltage and (2) the product of a predetermined constant and the positive sequence component of said faulted transmission line voltage.

2. A phase distance protective relay in accordance with claim 1 in which said faulted transmission line voltage comprises the faulted phase voltage between two phases of said three phase power system and in which said positive sequence component comprises the positive sequence component of said faulted phase voltage.

3. A phase distance protective relay in accordance with claim 2 in which the predetermined constant is selected so that the product of said predetermined constant and the positive sequence component of said faulted phase voltage provides a signal approximately three times the expected arc voltage drop for a relatively close in fault between said two phases and approximately twice the expected arc voltage drop for a fault between said two phases and ground such that said polarizing signal is effective for said close-in faults while still allowing said faulted phase voltage between said two phases to cause said polarizing signal to be effective for remote faults.

4. A phase distance protective relay in accordance with claim 3 in which the predetermined constant is approximately 0.3.

5. A phase distance protective relay in accordance with claim 1 in which said AND circuit means is responsive to two input signals thereto.

6. A ground distance protective relay in accordance with claim 1 in which said faulted transmission line voltage comprises the faulted voltage between one of said three phases of said power system and ground potential and in which said positive sequence component comprises the positive sequence component of said faulted phase voltage.

7. A ground distance protective relay in accordance with claim 6 in which said predetermined constant is approximately 0.3.

8. A ground distance protective relay in accordance with claim 7 in which said AND circuit means is responsive to two input signals thereto.

* * * * *